United States Patent [19]

Mezei et al.

[11] 3,830,533
[45] Aug. 20, 1974

[54] PIPE COUPLING WITH ROTARY CLAMPS
[75] Inventors: George A. Mezei, Costa Mesa; Harold M. Gibbons, Long Beach, both of Calif.
[73] Assignee: FMC Corporation, San Jose, Calif.
[22] Filed: Nov. 6, 1972
[21] Appl. No.: 304,026

[52] U.S. Cl............................. 285/364, 269/244
[51] Int. Cl............................................ F16l 17/00
[58] Field of Search........... 285/364, 420, 405, 406, 285/1, 24, 18, 88, 368, 363, 412, 33; 24/243 DP, 243 CC, 243 B, 263 A, 263 LS; 403/337, 338, 406; 248/361 B; 269/240, 244, 245

[56] References Cited
UNITED STATES PATENTS

| 139,157 | 5/1873 | Jackson et al. | 269/245 X |
| 1,514,803 | 11/1924 | Souter et al. | 285/364 |
| 2,916,789 | 12/1959 | Hendrix | 285/405 X |
| 2,996,318 | 8/1961 | Gravert | 285/364 X |
| 3,002,726 | 10/1961 | Ford | 269/244 X |
| 3,191,969 | 6/1965 | Wrenshall | 285/24 |
| 3,266,793 | 8/1966 | Christensen | 269/240 |
| 3,445,127 | 5/1969 | Clarke | 285/88 |
| 3,473,830 | 10/1969 | Haley | 285/364 X |

FOREIGN PATENTS OR APPLICATIONS

| 548,314 | 4/1932 | Germany | 285/364 |
| 1,196,449 | 7/1965 | Germany | 285/406 |

Primary Examiner—Alfred R. Guest
Attorney, Agent, or Firm—W. W. Ritt, Jr.; C. E. Tripp

[57] ABSTRACT

A pipe coupling device for releasably securing together two abutting pipe flanges. The coupling device comprises a plurality of individual rotary clamps mounted on and spaced around a radial pipe flange, each clamp having an arm with a jaw for gripping an opposing pipe flange and a stem slip fitted into a housing so as to be rotatable and translatable relative thereto for effecting clamping and unclamping movements. A drawbolt is threaded into a bore in the clamp arm's stem to move the stem forward or backward with respect to the housing, and an anti-gravity spring keeps the clamp arm's jaw from rotating into an inconvenient position due to gravity action. A swing spring maintains frictional contact between the threads of the drawbolt and those of the clamp arm's stem to cause the clamp arm's jaw to rotate in either of two directions against a housing stop as the drawbolt is turned. The jaw has a pair of closely spaced, outwardly extending bosses between which a tool can be placed as an auxiliary means, for swinging the jaw into and out of clamping position.

18 Claims, 6 Drawing Figures

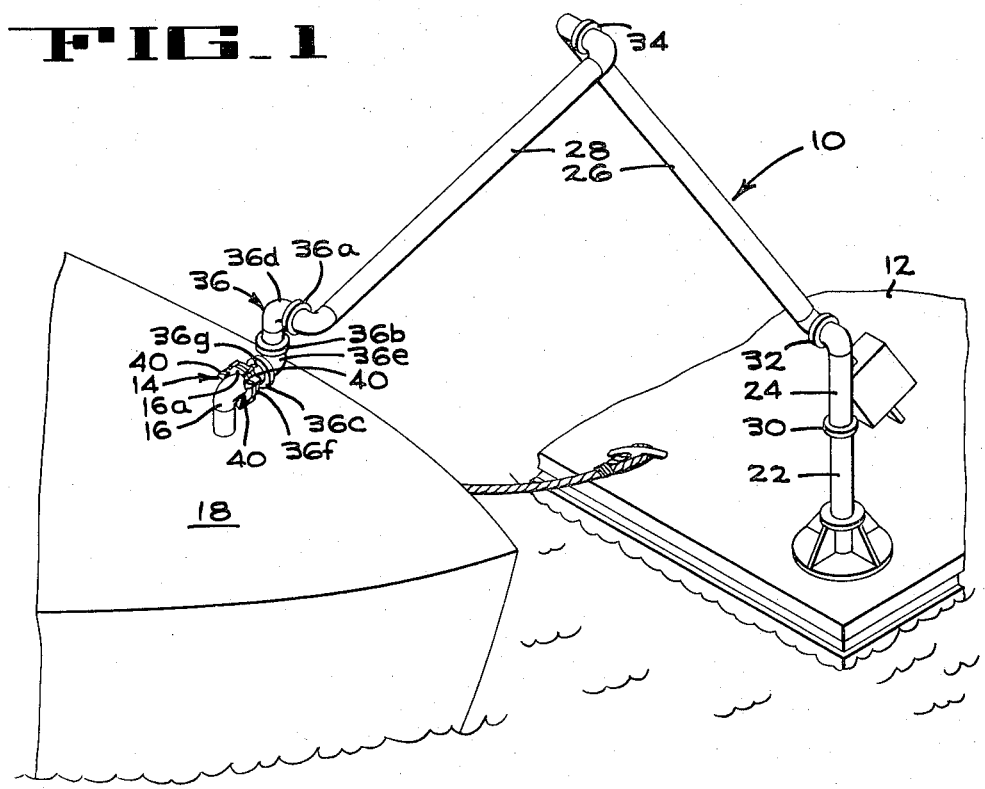

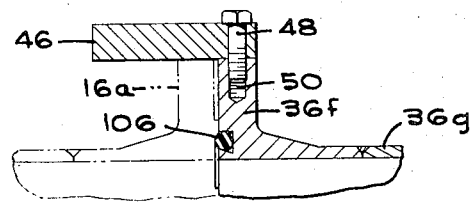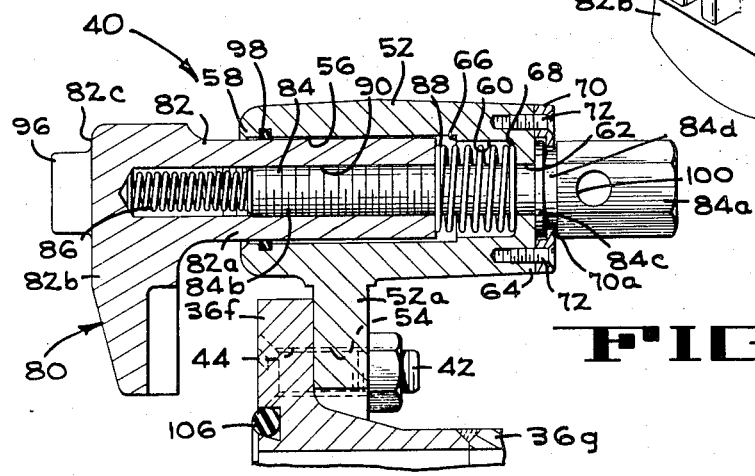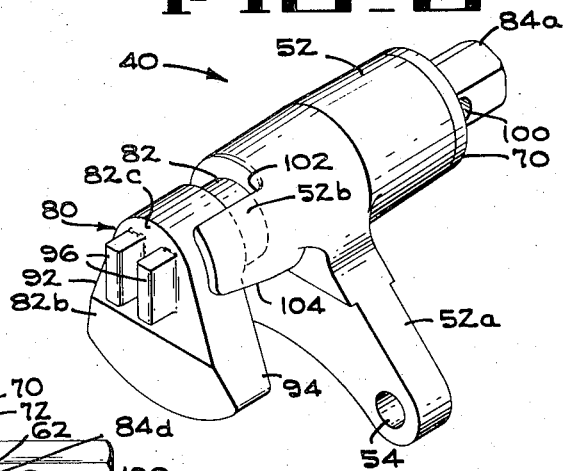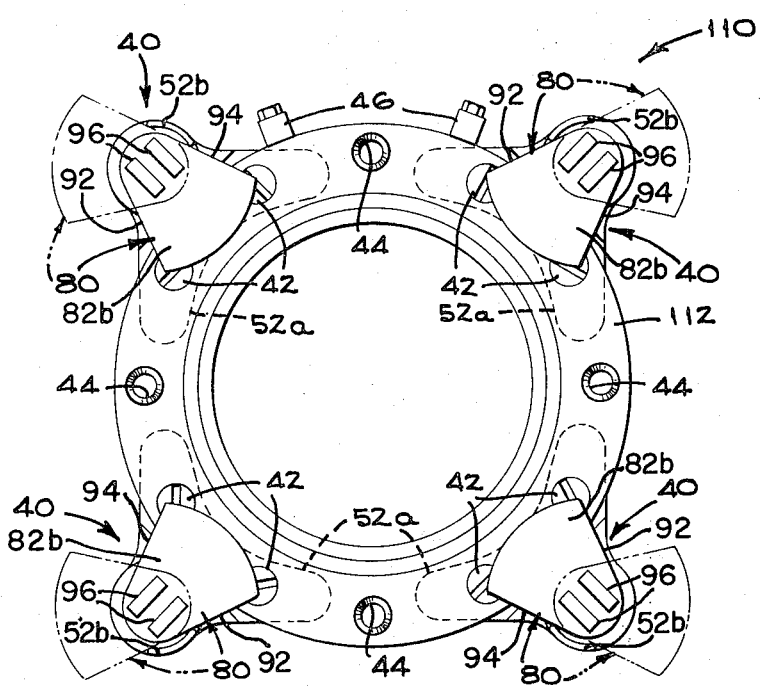

PIPE COUPLING WITH ROTARY CLAMPS

BACKGROUND OF THE INVENTION

1. Field of the Invention

This invention relates to coupling or clamping devices, and more particularly to pipe coupling equipment especially suited for use in clamping together hose or pipe flanges. In a specific embodiment the invention relates to employment of such coupling devices for making fluid tight connections between marine loading arms and tanker vessels.

2. Discussion of the Prior Art

Coupling devices suited for clamping pipe or hose flanges together are commonly used in making fluid tight connections between marine loading arms and tanker manifolds in a quick, secure and safe manner. Various coupling devices have been devised especially for this purpose, and some examples are described in the U.S. Pat. Nos. 2,916,789 to Hendrix, 3,191,969 to Wrenshall, 3,473,830 to Haley, 3,489,434 to Haley, 3,586,350 to Ashton, and 3,661,408 to Gibbons. In addition, other types of flange coupling devices such as that disclosed in U.S. Pat. No. 3,165,341 to Burns et al., although designed for use in different applications, might in some instances be adaptable for making the above-mentioned connections.

As verified by the prior art, the various devices heretofore used for coupling loading arms to the manifolds of tanker vessels range in design from relatively simple couplers utilizing C-type clamps to hydraulically powered couplers utilizing toggle actuated clamps. Some couplers employ clamps that work on a cam action principle, others work on a combination cam and screw action principle. Each of the many different available coupling devices has certain inherent limitations and relative advantages and disadvantages. Some of the available devices are overly complicated for the task they are to perform. Other devices of the so called "quick acting" type are somewhat slow and difficult to operate by hand. Some devices can not be used as safely as might be desired. In still other devices the parts that apply clamp pressure are subjected to detrimental moment or bending loads, they tend to operate unsmoothly, and as a result they take an inordinate amount of time and effort to operate. Many devices are incapable of affording a relatively wide clamping range and are therefore limited to use in coupling flanges or parts whose combined thickness, from instance to instance, falls within a relatively narrow range. In view of the limitations of the various devices, it is manifestly desirable that new and improved coupling devices, especially devices highly suited for utilization in joining the terminal flange of a marine loading arm and a tanker vessel manifold, be devised to meet particular needs. It is further manifestly desirable that a new and different, smoothly operating coupling device be devised that can overcome many of the limitations of the pre-existing devices, be of relatively simple construction, and be capable of rapid use in a safe and convenient manner yet always provide a secure coupling.

Special factors are involved when making a fluid tight coupling between the outboard end flange of a marine loading arm on a pier, etc., and an end flange on the manifold of a tanker vessel moored in the water near the loading arm. These end flanges may be of different thicknesses, and therefore it is desirable that they be coupled by a device having a relatively wide clamping range. The pipes to be joined at the end flanges can be of relatively large diameter and heavyweight. The possibility of sudden movements of the pipes to be coupled or uncoupled creates a certain safety hazard that should be minimized by the design of the particular coupling device that is employed to make the coupling. The present invention provides a flange coupling device exhibiting wide clamping range and usable with a high degree of safety.

SUMMARY OF THE INVENTION

The present invention provides a clamp-type flange coupling device suited for conveniently and safely making a fluid-tight connection between hose or pipe flanges. The device includes a plurality of unique rotary clamps of simple construction, each of these clamps including a housing with a clamp arm assembly disposed therein in such manner that the clamp arm movement relative to the housing is easily accomplished manually by using a tool such as a bar or wrench to turn a drawbolt whose shank is screwed into the clamp arm The clamp arm includes a stem that can slide back and forth within the housing, and a jaw disposed in front of the housing that can be swung, by turning the drawbolt, into or out of clamping position upon rotation of the stem. These parts cooperate with a swing spring, an anti-gravity spring, and a housing stop to achieve convenient clamping and unclamping of pipe or hose flanges.

It is a general object of the present invention to provide an improved flange coupling device comprised of unique, rotary-style clamp devices.

It is another object of the invention to provide a flange coupling device whose rotary clamps include a drawbolt-operated, spring biased clamp arm that can be pulled into or pushed out of a housing by turning a drawbolt to first swing the clamp's jaws against opposite sides of a housing-stop formation, and then apply or release clamping pressure to two parts for holding them together in a secure manner.

It is another object of the invention to provide a unique, rotary style clamp device adaptable for use in coupling pipe and hose flanges, as in the coupling of marine loading arms to tanker manifolds, and further adaptable for use in jigs, fixtures, work holders, etc.

The above and other objects of the invention, as well as advantages and features thereof, will be made more evident upon review of the following discussion of two embodiments thereof taken in conjunction with the accompanying drawings.

BRIEF DESCRIPTION OF THE DRAWINGS

FIG. 1 is a diagrammatic illustration of a marine loading arm mounted on a pier and connected to a manifold flange of a marine tanker by a coupling device according to the present invention.

FIG. 2 is an enlarged end view of a coupling device of the present invention, comprising three rotary clamps mounted on a pipe flange.

FIG. 3 is a perspective view of a single rotary clamp according to the present invention.

FIG. 4 is an enlarged fragmentary section taken along line 4—4 of FIG. 2.

FIG. 5 is a fragmentary section taken along line 5—5 of FIG. 2.

FIG. 6 is an end view of a coupling device of this invention, with four rotary clamps mounted on a pipe flange.

DESCRIPTION OF THE PREFERRED EMBODIMENTS

An application of the present invention is broadly illustrated on FIG. 1 wherein a marine loading arm 10 on a pier 12 has its outer end connected by a coupling device, indicated generally at 14, to a manifold 16 of a tanker or other marine vessel 18 moored in the water near the pier 12. The loading arm 10 is used to carry fluid, such as petroleum, from a tanker compartment to an onshore storage facility, or vice versa, in the usual manner.

The arm 10 comprises a plurality of pipes that form a lower riser section 22, an upper riser section 24, an inboard section 26, and an outboard section 28, these sections interconnected by swivel joints 30, 32, 34 to allow for horizontal and vertical movement of the arm. Attached to the outer end of the arm's outboard section 28 is a triple swivel joint assembly 36 composed of swivel joints 36a, 36b and 36c interconnected through pipe elbows 36d, 36e and a pipe flange 36f connected to the swivel joint 36c, as by a short length of straight pipe 36g. It is to the flange 36f that the coupling device 14 of the present invention is directly attached.

The coupling device 14 comprises a plurality of rotary clamp assemblies 40 for securing the outer end of the loading arm to the manifold 16 of the tanker 18 in a fluid tight manner, and more specifically by clamping the pipe flange 36f to an opposing pipe flange 16a on the end of the manifold 16. As shown in detail in FIGS. 2 to 5 that illustrate a three-clamp embodiment, these rotary clamps 40 are secured in circumferentially spaced relation to the pipe flange 36f by flat head bolts 42 that pass through spaced holes 44 in the flange. Two longitudinally oriented alignment bars 46, one of which is shown in the section view of FIG. 5, are secured to the upper area of the circumference of the flange 36f by cap screws 48 threaded into radial holes 50. These bars 46 permit "hanging" the flange 36f upon the tanker's flange 16a with their faces approximately parallel preparatory to bringing these flanges into abutting relation, in order to provide optimum connecting conditions for making a fluid-tight joint therebetween.

Each rotary clamp 40 includes a housing 52 (best shown in FIGS. 3 and 4) with a lateral bracket 52a for securing it to the loading arm's flange 36f. The bracket 52a has two holes 54, one of which is clearly visible in FIG. 3, positioned to coincide with the holes 44 in the flange 36f and through which the flat head bolts 42 extend. The housing 52 has a deep bore 56 (FIG. 4) extending from its front end 58, and a relatively shallow, smaller diameter bore 60 extending from the bottom of the bore 56. A hole 62 extends from the bottom of the bore 60 through the back end 64 of the housing 52, this hole 62 having a considerably smaller diameter than the bore 60. As can be seen in FIG. 4, the bores 56, 60 and the hole 62 are coaxial and form annular shoulders 66, 68 in the interior of the housing 52. A plurality of arcuate drawbolt retainer plates 70, each having an inwardly extending radial flange 70a, are removably secured to the back end 64 of the housing 52 by flat head screws 72. The housing 52 also has a stop portion 52b (FIG. 3) extending forwardly of its front end 58, for a purpose to be later defined.

The housing 52 contains a clamp assembly, indicated generally at 80, consisting of a clamp arm 82, a drawbolt 84, a swing spring 86, and an anti-gravity spring 88. The clamp arm 82 has a cylindrical stem 82a with a threaded internal bore 90 open at one end, a lateral clamp jaw 82b with two sides 92, 94 (FIG. 3), and two bosses 96 extending outwardly from its end surface 82c. The clamp arm's stem 82a slidably fits within the housing's bore 56, and an O-ring or other annular seal element 98 establishes a seal between the stem and the bore to preclude entry of dirt, etc., and escape of grease or other lubricant. A bar can be inserted between the two bosses 96 and used to rotate the clamp arm 82 relative to the housing 52, if, for any reason, it should become frozen thereto. For example, should the rotary clamp be used in a cryogenic application wherein it freezes up so that the clamp arm 82 is not free to move, the drawbolt 84 can be held against rotation while the clamp arm is freed by inserting a bar between the bosses and applying torque to it.

The drawbolt 84 includes an elongated hexagonal head 84a with a transverse hole 100 therethrough, and a threaded shank 84b. The hole 100 is provided to allow for the use of a bar tool in turning the drawbolt head, which head can of course also be turned by a wrench. A shank flange 84c, spaced from the head 84a by a peripheral groove 84d, cooperates with the plates 70 to retain the drawbolt in its functional position illustrated in FIG. 4.

Each rotary clamp 40 is assembled by first introducing the drawbolt shank 84b into the housing hole 62, and then fastening the plates 70 to the housing so that the drawbolt's shank flange 84c is rotatably disposed between the retainer flanges 70a and the housing's back end 64. The anti-gravity spring 88 is then installed over the drawbolt's shank 84b and positioned in the housing's bore 60. The swing spring 86 is placed in the stem bore 90 of the clamp arm 82 and the stem 82a is slipped into the housing bore 56, there being a slight radial clarance between the stem and the bore to provide a sliding fit therebetween. While the clamp jaw 82b is held against rotation, the drawbolt shank 84b is rotated by means of a bar in the hole 100 or a wrench on the head 84a, to thread it into the shank 82a until the clamp arm 82 reaches the position, in relation to the housing, shown in FIG. 4. The bar or wrench may then be removed, or may be left in position for later use in performing clamping and unclamping procedures.

In the assembled clamp the anti-gravity spring 88 is compressed between the end of the stem 82a and the shoulder 68, thereby urging the stem 82a outwardly of the housing bore 56 and creating frictional contact between the clamp arm 82 and the spring 88, between the spring and the housing's shoulder 68, and also between the housing's back end 64 and the drawbolt's flange 84c. These frictional engagements prevent the clamp jaw 82b from self-rotation into a downward position in response to the action of gravity. Although the spring 88 may be deleted, it is preferably included for the convenience it affords during clamping and unclamping operations.

The swing spring 86 is compressed between the bottom of the stem bore 90 and the end of drawbolt shank 84b, thus creating friction between the engaging threads of the shank and the bore. This friction acts to rotate the clamp arm 82 relative to the housing 52 when the drawbolt 84 is rotated, and the housing's stop portion 52b limits the rotation of the arm 82 between its "closed" position, as shown best in FIG. 2, and its "open" position as indicated in phantom in FIG. 2. Spring 86 could be eliminated and the rotary clamp 40 would still function, but it then would be necessary to rotate the clamp's jaw 82b into the desired position directly by hand, an undesirable and potentially unsafe practice that could result in injury to the operator should his hand get caught during relative movement between the tanker and the loading arm.

Accordingly, it is seen that the anti-gravity spring 88 and the swing spring 86 contribute significantly to the safe and rapid use of the rotary clamp 80. The spring 88 keeps the jaw 82b in a constant position until the spring 86 acts, upon rotation of the drawbolt 84, to swing the jaw in a desired position. This cooperation is of great advantage especially when only one operator is available to perform the coupling or uncoupling task, as the clamp can be opened or closed with one hand while, for example, the other hand is employed to guide and hold the arm and manifold flanges in coupling position.

The radial flanges 70a of the retainer plates 70 extend into the drawbolt's shank groove 84d (FIG. 4), thereby preventing the drawbolt from backing out of the housing 52 as it is being rotated to unthread it from the clamp arm's stem 82a. Normally the clamp arm slides freely in the housing, but over-torqueing the drawbolt, inadequate lubricant between the clamp arm and the housing bore 56, or excessive wear of the sliding surfaces in this bore could lead to a condition preventing movement of the clamp arm in the housing. Such a situation would cause the drawbolt to attempt to back out of the housing, i.e., move to the right as viewed in FIG. 4, as it is rotated to unthread it from the clamp arm until its shank flange 84c comes to rest against the retainer flanges 70a. From this point, further unthreading rotation of the drawbolt will force the clamp arm to move outwardly of the housing, i.e., to the left as viewed in FIG. 4.

In the embodiment described above, it may be observed that each of the three rotary clamps 40 of the coupling device 14 includes a clamp arm 82 to which a drawbolt 84 is threadedly fastened, and that the clamp's housing 52 is a support means that supports the drawbolt and clamp arm in such manner that the clamp arm will move along the longitudinal axis of the housing's bore 56 in one direction or the other when the drawbolt is rotated. Also, it may be noticed that the stop means 52b provides two top surfaces 102, 104 along its lateral edges for stopping the clamp arm 82 in first and second rotational positions, and that the drawbolt 84 and clamp arm are free to rotate relative to each other. Therefore, by virtue of these features each rotary clamp 40 of the device 14 can be disengaged from the manifold flange 16a by rotation of its drawbolt in the unthreading direction, thereby both rotating the clamp arm 82 against the surface 102 of the stop 52b and translating it outwardly of the housing 52, i.e., to the left as viewed in FIG. 4. Conversely, the clamp 40 can be engaged with the flange 16a by rotating the drawbolt in the threading direction, thus both rotating the clamp arm 82 against the surface 104 of the stop 52b and translating it inwardly of the housing 52, i.e., to the right per FIG. 4.

In order to couple the loading arm 10 to the tanker manifold flange 16a by means of the device 14, the loading arm with its clamp arms 82b in their "open" position (shown in phantom in FIG. 2) is maneuvered to position its flange 36f against the flange 16a and in coaxial relation therewith, as by "hanging" the end of the arm on the flange 16a by means of the alignment bars 46 and then moving the flange 36f into abutment with the flange 16a (FIG. 5). With the flanges in this abutting relation, the drawbolts of the rotary clamps 40 are then rotated in their threading direction, thereby rotating the clamp arms 82b into their "closed" position (shown in solid in FIG. 2), i.e., with their sides 94 against the surfaces 104 of the stops 52b, and drawing them in against the back of the flange 16a. As seen in FIGS. 2, 4 and 5, the loading arm flange 36f is equipped with an O-ring or other annular seal element 106 that provides a fluid-tight seal with the abutting manifold flange 16a, thereby preventing leakage of fluid through the joint formed by the flanges after they have been clamped together.

Uncoupling the loading arm 12 from the manifold flange 16a is accomplished by simply rotating the drawbolts 84 in their unthreading direction, thereby causing the clamp arms 82 to release their tight grip on the flange 16a and rotate into their "open" position wherein their sides 92 lie against the surfaces 102 of the stops 52b, i.e., the position indicated in phantom in FIG. 2. The loading arm then is free to be maneuvered away from the tanker into, for example, its stowed position (not shown).

FIG. 6 shows a second embodiment of the invention, comprising a coupling device 110 with four rotary clamps 40 bolted onto a loading arm flange 112. In this embodiment the four rotary clamps are essentially identical to those shown in FIGS. 2 to 5, the only difference being that the spacing of the holes 44 in the flange 112 and the holes 54 in the clamp housing brackets 52a through which the flat head bolts 42 extend to secure the clamps to the flange. It can be seen that the locations of the holes 44, 54 allow the four rotary clamps 40 to be fastened to the loading arm's flange 112 in equally spaced relation to one another.

In the two coupling device embodiments above described, the clamp brackets are suited for equal spacing of various numbers of rotary clamps around pipe flanges having different numbers of equally spaced flange holes. It may be readily appreciated that optimum clamping action can be achieved by always fastening the rotary clamps, whatever their number, in uniformly spaced relation about any particular pipe flange, and in this regard it is manifest that the number and location of bracket holes in any given rotary clamp may be varied so that the desired clamp spacing may be obtained when the clamps are fastened to a particular pipe flange. It is furthermore manifest that there are many different ways to fasten the rotary clamps directly or indirectly to a pipe flange while practicing the teachings of the present invention.

The coupling devices of the present invention afford several advantages. They function as rapid action, flange couplings of relatively low price. They employ rotary clamps whose clamping ranges are relatively wide (e.g., 2 to 3 inches of clamp arm travel) and thereby provide flange couplers with wider clamping range than devices that employ cam-type action in effecting clamping movements. This relatively wide clamping range allows flanges of widely different thicknesses to be coupled by the same device. Operation of the rotary clamps requires the use of only one hand to effect the clamping or unclamping action. An operator may safely use his other hand for positioning the pipe or hose flanges while joining or separating them.

The coupling action can be achieved very rapidly. Tests indicate that two 8 inch flanges can be easily coupled by three rotary clamps within 20 seconds, during which time the flanges are aligned and the three rotary clamps are progressively tightened and retightened onto the flanges with a bar tool or wrench. Thus these coupling devices are extremely useful in coupling marine loading arms to tanker manifolds.

A plurality of rotary clamps of a given coupling device can easily be made to operate simultaneously by providing a chain or belt drive attached to the drawbolt heads. Also, rotary clamps driven by other power means are easily conceivable. The rotary clamps are inexpensive, simple and quick acting. They are so constructed that their drawbolts are not subjected to any moment or bending loads during clamping and unclamping, an advantage that is unavailable in coupling devices utilizing C-clamps.

The above described coupling devices and rotary clamps can be modified in various ways without departing from the teachings of the invention. It is possible, for example, to change the manner in which the rotary clamps are affixed to a flange. They might, for example, be mounted on a collar, with two assembled halves, secured to a pipe flange. They need not be secured in place by bolting but may be secured in some other way. The clamp drawbolts might be precluded from backing out of the housing in some other manner, within the realm of mechanical skill, than that shown herein. Each rotary clamp might be modified slightly to assume the form of a hand wrench or clamp fixture.

Although the best mode contemplated for carrying out the present invention has been herein shown and described, it will be apparent that modifications and variation may be made without departing from what is regarded to be the subject matter of the invention.

We claim:

1. A rotary clamp, suited for use in a flange coupling device and elsewhere, comprising:
a housing with an internal, open-ended bore; means for mounting the housing on a support for the clamp; a clamp arm with a stem and a lateral jaw at one stem end, said stem having a threaded, open-ended, bore and being slip fitted into the housing bore; a drawbolt with a head and a threaded shank, said drawbolt being disposed with its shank fitted loose through an opening in the housing and screw threaded into the stem bore; and a stop on the open end of the housing near the jaw of the clamp arm, said clamp arm being rotatable in relation to the housing to swing the jaw into and out of abutment with the stop; whereby rotation of the drawbolt, caused by turning the drawbolt head, results in translatory sliding movement of the clamp arm stem with the housing internal bore when the jaw abuts the stop, the direction of rotation of the drawbolt governing whether the clamp arm moves inward or outward of the housing internal bore.

2. A rotary clamp as set forth in claim 1, including means for preventing the drawbolt from backing out of the housing internal bore as it is rotated.

3. A rotary clamp as set forth in claim 1, including means for exerting force between the drawbolt and the clamp arm to cause the jaw to swing against one or the other side of the stop during rotation, in appropriate directions of the drawbolt.

4. A rotary clamp as set forth in claim 3, wherein the force exerting means comprises a swing spring disposed and compressed between the bottom of the stem bore and the end of the drawbolt shank.

5. A rotary clamp as set forth in claim 1, including means for maintaining the clamp arm in constant rotational relation to the housing despite gravitational action on said clamp arm.

6. A rotary clamp as set forth in claim 5, wherein the maintaining means comprises an anti-gravity spring disposed and compressed between the open end of the clamp arm stem and a rear wall of the housing.

7. A rotary clamp as set forth in claim 1, wherein the housing mounting means comprises a bracket with at least one hole for accepting a fastening means to secure the housing to a pipe flange or the like.

8. A rotary clamp as set forth in claim 1, wherein the clamp arm jaw includes boss means for turning the clamp arm relative to the housing and the drawbolt.

9. A rotary clamp comprising:
a housing unit having a housing with an internal bore that is open at one end and a bracket means extending laterally from said housing; a clamp arm having a cylindrical stem with a threaded axial bore extending inwardly from one end of said stem, and a jaw extending laterally from the other end of the stem; a forwardly projecting stop on the open end of the housing, said stop having first and second sides, said clamp arm stem being slip fitted into the housing bore to dispose the jaw of the clamp arm near said stop; a drawbolt having a threaded shank and a head at one end thereof, said head disposed behind the rearward wall of the housing and said shank being clearance fitted through an opening in the rearward wall and threaded into the stem bore of the clamp arm; a swing spring disposed within the stem bore and compressed between the bottom of said stem bore and the nearby end of the drawbolt shank; an antigravity spring disposed within the housing bore, encircling a portion of the drawbolt shank, and compressed between the rearward end of the clamp arm stem and the rearward housing wall; the aforesaid parts of the rotary clamp being arranged so that the head of the drawbolt can be turned relative to the housing (a) in a first direction to cause the clamp arm to rotate and swing its jaw into abutment with the first side of the stop wherein the jaw is in non-overhanging relation to the bracket means whereby subsequent turning of the head in the first direction acts to screw the clamp arm away from the head to translate the clamp arm forwardly relative to the housing, and (b) in a second direction to cause the clamp arm to rotate and swing its jaw into abutment with the second side of the stop wherein the jaw is in overhanging relation to the bracket means whereby subsequent turning of the head in the second direction acts to screw the clamp arm toward the head to translate the clamp arm rearwardly relative to the housing.

10. A rotary clamp as set forth in claim 9, wherein the bracket means includes at least one hole for receiving a screw fastener for securing said bracket means to a pipe flange.

11. A rotary clamp comprising:
a housing unit including a housing with an internal, cylindrical bore extending rearwardly from an opening in the front end thereof, and a bracket extending laterally from the housing, the housing having a forwardly projecting stop on its front end; a clamp arm having a laterally projecting jaw at its front end and a stem extending rearwardly from said front end, said stem including a threaded cylindrical bore extending frontwardly from an opening at the rear end of said stem; a drawbolt with a head and a threaded shank, the head disposed behind the rear wall of the housing and the shank extending through an opening in said rear wall and forwardly into the opening at the rear wall and forwardly into the opening at the rear end of the stem so that the shank threads within the stem bore are in threaded engagement with the stem bore threads; the housing stop and clamp arm jaw being so dimensioned that the clamp arm can be rotated, by turning the drawbolt, to swing the jaw into abutment with one side of the stop to dispose the jaw in non-overhanging relation to the bracket and can also be rotated, by turning the drawbolt, to swing the jaw into abutment with another side of the stop to dispose the jaw in overhanging relation to the bracket, the drawbolt capable of being turned by its head to translate the clamp arm forwardly or rearwardly during abutment of the jaw with a respective side of the stop by resultant screw action between the stem and the drawbolt shank.

12. A coupling device, suited for clamping two flanges together, having a plurality of rotary clamps operably disposed in a circular array, each rotary clamp including a housing with a stop thereon, a drawbolt, and a clamp arm with a jaw and a stem, the stem being slip fitted into a housing bore and the jaw being disposed for swinging movement into and out of abutment with respective sides of the stop, the drawbolt having a head and a threaded shank, the shank of the drawbolt being threaded into a stem bore, the head of the drawbolt being disposed outside the housing behind the stem therein, the head being rotatable to rotate the clamp arm to swing its jaw against one side of the stop and to translate the clamp arm, by screw action between the shank and stem, away from the head, the head being counterrotatable to rotate the clamp arm to swing its jaw against another side of the stop and to translate the clamp arm, by screw action between the shank and stem, toward the head, the rotary clamps being operably disposed to permit clamping together two abutting flanges when the jaws are abutting the aforesaid another side of the stops.

13. A coupling device as set forth in claim 12, wherein said rotary clamps include holder brackets extending laterally from the housings and adapted for securement to an arcuate segment of a flange.

14. A coupling device for clamping two parts together, comprising: a plurality of cooperable rotary clamps assembled in an array and each capable of clamping together respective portions of the two parts, each rotary clamp including a housing with an internal longitudinal bore, a clamp arm with a longitudinal stem having a threaded stem bore and with a laterally extending jaw at one end of the stem, a drawbolt having a head and a threaded shank, a stop on the housing, the clamp arm having its stem slip fitted into the housing bore and having its jaw disposed outside the housing near the stop thereof, the drawbolt having its head disposed outside the housing and having its shank in threaded engagement with the threads of the stem bore, and means coupling the clamp arm and drawbolt to cause swinging of the jaw against the stop when the drawbolt is turned.

15. A device as set forth in claim 14, wherein the coupling means is a swing spring disposed within the stem bore and compressed between the bottom of the stem bore and the drawbolt shank.

16. A device as set forth in claim 14 operably mounted on an end flange of a marine loading arm.

17. A coupling device mounted on a first flange for use in clamping a second flange thereto, the coupling device including a plurality of rotary clamps each having a housing unit including a housing and a bracket extending laterally from said housing, each bracket being fastened to a respective segment of the first flange, each housing including a longitudinal bore open at its forward end and further including a forwardly projecting stop on the forward housing end, each rotary clamp including a clamp arm with a stem thereof slip fitted into the housing bore and with a jaw thereof disposed forwardly of the forward housing end for swinging movement in opposite directions into abutment with the housing stop, each rotary clamp including a drawbolt with the head thereof disposed behind the rearward housing end and with the threaded shank thereof extending into the housing and engaging the threads of a stem bore, a spring disposed in the stem bore and urging the drawbolt shank outwardly of said stem bore, the clamp arm of each clamp being free to rotate against one side of the housing stop into nonclamping relation with the first flange and being free to rotate against another side of the housing stop into clamping relation with the first flange, the drawbolt of each clamp being rotatable, by turning its head, in a first direction to rotate the clamp arm and swing its jaw into abutment with the aforesaid one side of the housing stop and being rotatable in a second direction to rotate the clamp arm and swing its jaw into abutment with the aforesaid another side of the housing stop, whereby a second flange may be clamped to the first flange by (a) positioning the jaws of the clamps in nonclamping relation to the first flange, (b) bringing the second flange into coaxial abutment with the second flange, and (c) turning the drawbolt heads to rotate the clamp arms and swing their jaws into clamping relation with the flanges and to thereafter draw the jaws inwardly of the housings to clamp the second flange between the jaws and the first flange.

18. A rotary clamp comprising:
a clamp member including a jaw, a drawbolt threaded to the clamp member, means for supporting the drawbolt and clamp member so that said clamp member will move along a longitudinal axis in a first longitudinal direction when the drawbolt is rotated in a first direction and will also move along the same longitudinal axis in a second longitudinal direction when the drawbolt is rotated in a second direction, the drawbolt being free to rotate in opposite directions relative to the clamp member, the support means including stop means thereon providing a first stop surface and a second stop surface for respectively stopping the clamp member in first and second respective rotational positions, whereby the drawbolt can be rotated in the first direction when the clamp arm is in the first rotational position to move the clamp member in the first longitudinal direction, and whereby the drawbolt can also be rotated in the second direction when the clamp arm is in the second rotational position to move the clamp member in the second longitudinal direction.

* * * * *